United States Patent
Block

(10) Patent No.: US 9,602,310 B2
(45) Date of Patent: Mar. 21, 2017

(54) ASSOCIATING SYSTEM REQUESTS WITH SMS USER RESPONSES

(75) Inventor: Frederick P. Block, Westminster, CO (US)

(73) Assignee: Avaya Inc., Basking Ridge, NJ (US)

( * ) Notice: Subject to any disclaimer, the term of this patent is extended or adjusted under 35 U.S.C. 154(b) by 1260 days.

(21) Appl. No.: 12/244,515

(22) Filed: Oct. 2, 2008

(65) Prior Publication Data

US 2010/0088302 A1  Apr. 8, 2010

(51) Int. Cl.
*G06F 7/00* (2006.01)
*H04L 12/58* (2006.01)
*H04L 1/18* (2006.01)
*H04W 4/12* (2009.01)
*H04W 4/14* (2009.01)

(52) U.S. Cl.
CPC .......... *H04L 12/5895* (2013.01); *H04L 51/38* (2013.01); *H04L 1/1867* (2013.01); *H04W 4/12* (2013.01); *H04W 4/14* (2013.01)

(58) Field of Classification Search
None
See application file for complete search history.

(56) References Cited

U.S. PATENT DOCUMENTS

| 7,149,537 | B1 | 12/2006 | Kupsh et al. |
| 7,619,584 | B2* | 11/2009 | Wolf .............................. 345/1.2 |
| 2004/0002350 | A1* | 1/2004 | Gopinath et al. ............. 455/466 |
| 2004/0022264 | A1* | 2/2004 | McCue .......................... 370/464 |
| 2004/0054726 | A1* | 3/2004 | Doss et al. .................... 709/205 |
| 2006/0031361 | A1 | 2/2006 | Bailey et al. |
| 2006/0193264 | A1* | 8/2006 | Bonar et al. .................. 370/252 |
| 2007/0066327 | A1* | 3/2007 | Karmakar ..................... 455/466 |
| 2007/0118647 | A1 | 5/2007 | Lee et al. |
| 2007/0288576 | A1 | 12/2007 | Illg |
| 2008/0077468 | A1* | 3/2008 | Raskin ........................... 705/10 |
| 2008/0189623 | A1 | 8/2008 | Patil |

(Continued)

FOREIGN PATENT DOCUMENTS

JP   2001-320544   11/2001
WO   WO 2005/083934   9/2005

OTHER PUBLICATIONS

Search Report for UK Patent Application No. 0910495.1, dated Sep. 18, 2009.

(Continued)

*Primary Examiner* — Hosain Alam
*Assistant Examiner* — Thu Nga Nguyen
(74) *Attorney, Agent, or Firm* — Sheridan Ross P.C.

(57) ABSTRACT

A messaging system can initiate a communication with one or more users through via cell phone text messages, for example using the short message service protocol. These systems often need a way to correlate user responses with system requests or queries. This problem can present challenges because the email mailbox metaphor used by cell phone user interfaces generally allows users to reply to any previously sent messages, but no message context is automatically supplied. A system that may send multiple messages to a user needs a mechanism by which the system can correlate a user-sent response to one of potentially many system-sent requests or queries. Context correlation to resolve ambiguities can be based on one or more of a dialog-based solution, a token-based solution and a keyword-based solution.

20 Claims, 5 Drawing Sheets

(56) References Cited

U.S. PATENT DOCUMENTS

2009/0106374 A1* 4/2009 Easwar et al. ............... 709/206
2009/0125499 A1* 5/2009 Cross et al. ..................... 707/5

OTHER PUBLICATIONS mTAG—White Paper; Internet article printed on Nov. 11, 2008 at http://docs.bulletinwirelsss.net/display/public/mTAG+-+White+Paper?decorator; 6 pages.
SMPP Short Message Peer to Peer Protocol (2-Way-SMS protocol); Internet article printed on Nov. 11, 2008 at http://www.wirelessbrasil.org/wirelessbr/secoes/sec_smpp/sec_smpp.html; 12 pages.
Official Action for United Kingdom Patent Application No. GB0910495, dated Apr. 18, 2012 7 pages.
Official Action for United Kingdom Patent Aplication No. GB0910495.1, dated Nov. 21, 2012 7 pages.
Official Action for United Kingdom Patent Application No. GB0910495.1, dated Feb. 11, 2013 5 pages.
Official Action for United Kingdom Patent Application No. GB0910495.1, dated Apr. 24, 2013 3 pages.
Official Action with English Translation for Germany Patent Application No. 102009031304.4, dated Jul. 31, 2014 14 pages.

* cited by examiner

ASSOCIATING SYSTEM REQUESTS WITH SMS USER RESPONSES

FIELD OF THE INVENTION

An exemplary embodiment of this invention relates to communications devices, protocols and techniques. More specifically, an exemplary aspect of this invention relates to correlating context in an SMS environment to a specific request or query.

BACKGROUND

The Short Message Service (SMS) protocol enables the exchange of messages between one or more communications devices.

One exemplary application that utilizes SMS protocol to send and receive SMS message(s) is a Communications Process Manager (CPM). A communications process manager is typically a software and services solution that enables integration of intelligent communications into business applications and processes to reduce human latency and to create a competitive advantage. More specifically, a communications process manager can execute and orchestrate all of the communication activities required when an event in a business process requires contact with one or many key individuals, seamlessly finding the right people and contacting them through any or all means available, such as email, SMS, office phone, mobile phone, etc.

Recipients of notifications from the communications process manager can interact with the communications process manager via voice, web, SMS, etc. Users can respond, update, and complete work items with this solution. A communications process manager can provide accurate tracking and fully closed loop communications to the originating business application, quicker reaction to mission-critical events, more effective problem resolution and a clear ROI.

For example, based on events or triggers in the workflow or business application(s), open standard messages can be sent by the communications process manager to invoke loose-coupled high-level composite communication web services. Business rules can be defined in the business applications, while the rules of how to intelligently communicate to process owners, stake holders, and other end users are stored by the communication process manager. Corporate LDAP directories can also be leveraged to provide contact data.

The communication process manager can leverage existing technologies such as SIP telephony servers, interactive voice response servers including text-to-speech and automated speech recognition services, conference bridges, email, instant messaging and the like. A typical communication process manager can intelligently orchestrate real-time multi-channel communications based on business process events or, for example, manually at the request of a user. These communications can be integrated into business applications and processes which can create more intelligent processes with reduced latency.

SUMMARY

A messaging system, such as the CPM messaging system discussed above, can initiate a communication with one or more users through, for example, cell phone text messages or to another endpoint device, and specifically using the short message service protocol. These systems often need a way to correlate user responses with system requests or queries. This problem can present challenges because the email mailbox metaphor used by cell phone user interfaces generally allows users to reply to any previously sent messages, but no message context is automatically supplied. A system that may send multiple messages to a user needs a mechanism by which the system can correlate a user-sent response to one of potentially many system-sent requests or queries.

While some cell phones present messages in a "threaded" view, where all messages sent from the same origination address (same sender) are available in dialog history, the mechanisms to allocate a unique sender address for each message defeat this feature, making each message—even multiple messages sent from the same system—appear to be from a different sender. In addition, use of unique, origination addresses is expensive since SMS gateway services typically charge per origination address and may be charged per character as well.

Unless a sending system, such as a CPM, has a very high traffic rate the chances that multiple messages are outstanding for a single user are not high. Using this insight, a dialog between the sending system and the user can be either asynchronous (where only one request is outstanding), or synchronous (where multiple requests are outstanding), to optimize the user/system communication for cases where only a single request is outstanding.

For example, an automated system such as a CPM typically wants a response comprising either a "yes" or "no" reply or a choice from among some number of alternatives. A reply such as "Y" or "N" (for a yes/no reply, respectively) or a letter A-Z or 1-n for a choice among alternatives is the "natural" response. As long as only one request is outstanding, a message from the user to the system comprising just the natural response is sufficient and unambiguous.

However, if more than one request is outstanding (for example, two yes/no questions), a response that includes no context cannot be correlated with a specific request.

One exemplary embodiment of this invention addresses this situation and allows the natural response if one request is outstanding, but if more than one request is outstanding, to engage the user in a dialog that may mimic how two people would resolve the ambiguity.

Consider a system being used to seek approval for sales discount amounts. An approval manager might get SMS messages such as:

1. System sends: $ mmm contract for product X for company ABC to be discounted by 30%. Approve (Y/N/message)?

The reply would be "Y" if the discount is approved, "N" if not, or a free form message (e.g., "max we should go is 25%"). If two messages are outstanding, this form of reply is ambiguous and misrepresenting the response could have dire business consequences. For example, before replying if another deal needs approval what might happen is a system would send a second message like:

2. System sends: $ mmm contract for product Y for company XYZ to be discounted by 60%. Approve (Y/N/message)?

At this point, any natural reply is ambiguous, but does indicate the user is likely paying attention to messages. If the system has sent these two messages and receives a "Y" reply, the system can clarify the reply using a conversational approach such as:

3. User sends: Y

4. System sends: two requests are pending

5. System sends: $ mmm contract for product X for company ABC to be discounted by 30%. Approve (Y/N/message)?

6. User sends: Y

7. System sends: $ mmm contract for product Y for company XYZ to be discounted by 60%. Approve (Y/N/message)?

8. User sends: max we should go is 40%

The initial "Y" (No. 3 in the above example) is essentially ignored except as an indication that the user is now ready to engage in a dialog. After repeating the first question, the system can then interact with the user in a "synchronous" fashion, with each reply from the user assumed to pertain to the immediately previous request. If the user's response is sufficiently delayed, and there are still requests outstanding, the subsequent reply from the user is again ignored except as an indication that the user is ready to converse. Also, if a new request arrives while the dialog is active, the new request could not be sent immediately but rather added to the queue of requests pending for the user. In the dialog with the user, the request could be reordered (for example, based on priority) so a newly arrived request could be presented before other, older, requests.

This general style of user interaction could be combined with a "token-based" approach, where each pending request has some form of request identifier allowing the user to send an unambiguous response. With this combined approach, the sequence above could be reconfigured as follows:

1. System sends: aa: $nnn contract for product X for company ABC to be discounted by 30%. Approve (Y/N/message)?

2. System sends: ab: $mmm contract for product Y for company XYZ to be discounted by 60%. Approve (Y/N/message)?

3. User sends: aa y

4. System sends: one more quest pending

5. System sends: ab: $mmm contract for product Y for company XYZ to be discounted by 60%. Approve (Y/N/message)?

6. User sends: max we should go is 40%

In this variant, the initial response serves both as an unambiguous reply to one of the pending requests and as an indicator of willingness to start a dialog. State is maintained based on the tracking of messages and responses utilizing the request identifier. The system can determine which if any, responses have been answered and to which queries those responses are associated.

In a third variant, the system could accept a reply including a word of the user's choosing that identifies the question the user is responding to rather than a token provided by the system. This word could then be used to correlate the response with the request. In the examples above, perhaps the company name could be used in this manner.

In this variant, if multiple questions are pending for the user and the system receives a multi-word reply, and the first word of the reply appears in one and only one pending question, then the reply is assumed to be for that question (and otherwise the reply would be ignored except as an indicator that the user is ready to converse). With this technique, the sequence of requests and answers may be:

1. System sends: $nnn contract for product X for company ABC to be discounted by 30%. Approve (Y/N/message)?

2. System sends: $mmm contract for product Y for company XYZ to be discounted by 60%. Approve (Y/N/message)?

3. User sends: ABC Y

4. System sends: one more request pending

5. System sends: $mmm contract for product Y for company XYZ to be discounted by 60%. Approve (Y/N/message)?

6. User sends: max we should go is 40%

One exemplary benefit of this invention is that it does not necessarily require the expense of allocating multiple originating identities and does not require users to enter artificial request tokens with their responses. Thus, SMS messages can be treated as an SMS interaction with the user in an asynchronous or synchronous "modal" fashion depending on how many requests are outstanding for the user.

Exemplary aspects of the invention thus relate to communications management.

More specifically, exemplary aspects of the invention relate to managing SMS messages. Still further aspects of the invention relate to managing and correlating SMS queries to user responses.

Still further aspects of the invention relate to correlating SMS queries to SMS answers.

Still further aspects of the invention relate to managing state in an SMS message exchange environment.

Additional aspects of the invention relate to utilizing tokens to maintain context in a messaging environment.

Even further aspects of the invention relate to utilizing key words to maintain context in a messaging environment.

Aspects of the invention also relate to utilizing a series of modules to correlate user responses with CPM generated queries.

Still further aspects of the invention relate to utilizing a mailbox-type structure to assist with maintaining a state for each user.

Additional aspects of the invention relate to utilizing a question and answer based approach to resolve context correlation issues.

Still further aspects of the invention relate to determining whether the SMS message is a query, an SMS message is not a query, filtering out that non-query type message when making context correlation determinations.

The present invention can provide a number of advantages depending on the particular configuration. These and other advantages will be apparent from the disclosure of the invention(s) contained herein.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation done without material human input when the process or operation is performed. However, a process or operation can be automatic even if performance of the process or operation uses human input, whether material or immaterial, received before performance of the process or operation. Human input is deemed to be material if such input influences how the process or operation will be performed. Human input that consents to the performance of the process or operation is not deemed to be "material".

The term "computer-readable medium" as used herein refers to any tangible storage and/or transmission medium that participate in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like.

While SMS is illustratively used with the present invention, the concepts and techniques disclosed herein are applicable to other protocols such as Session Initiation Protocol or SIP, which is a simple signaling/application layer protocol for network multimedia conferencing and telephony.

Accordingly, the invention is considered to include a tangible storage medium or distribution medium and prior art-recognized equivalents and successor media, in which the software implementations of the present invention are stored.

The terms "determine", "calculate" and "compute," and variations thereof, as used herein, are used interchangeably and include any type of methodology, process, mathematical operation or technique.

The term "module" as used herein refers to any known or later developed hardware, software, firmware, artificial intelligence, fuzzy logic, or combination of hardware and software that is capable of performing the functionality associated with that element. Also, while the invention is described in terms of exemplary embodiments, it should be appreciated that individual aspects of the invention can be separately claimed.

The preceding is a simplified summary of the invention to provide an understanding of some aspects of the invention. This summary is neither an extensive nor exhaustive overview of the invention and its various embodiments. It is intended neither to identify key or critical elements of the invention nor to delineate the scope of the invention but to present selected concepts of the invention in a simplified form as an introduction to the more detailed description presented below. As will be appreciated, other embodiments of the invention are possible utilizing, alone or in combination, one or more of the features set forth above or described in detail below.

DETAILED DESCRIPTION OF THE INVENTION

The invention will be illustrated below in conjunction with an exemplary messaging system. Although well suited for use with, e.g., a system using a server(s), such as a CPM server, and/or database(s), the invention is not limited to use with any particular type of communication system or configuration of system elements. Those skilled in the art will recognize that the disclosed techniques may be used in any application in which it is desirable to provide message context correlation.

The exemplary systems and methods of this invention will also be described in relation to software, modules, and associated hardware and network(s). However, to avoid unnecessarily obscuring the present invention, the following description omits well-known structures, components and devices that may be shown in block diagram form, are well known, or are otherwise summarized.

For purposes of explanation, numerous details are set forth in order to provide a thorough understanding of the present invention. It should be appreciated, however, that the present invention may be practiced in a variety of ways beyond the specific details set forth herein.

Although certain embodiments of the present invention are discussed in connection with a primary service being a SMS-based service, one skilled in the art will appreciate that embodiments of the present invention can be equally useful when applied to non-SMS-based services such as instant messaging, email, or in general any communications protocol or format.

Figure 1:
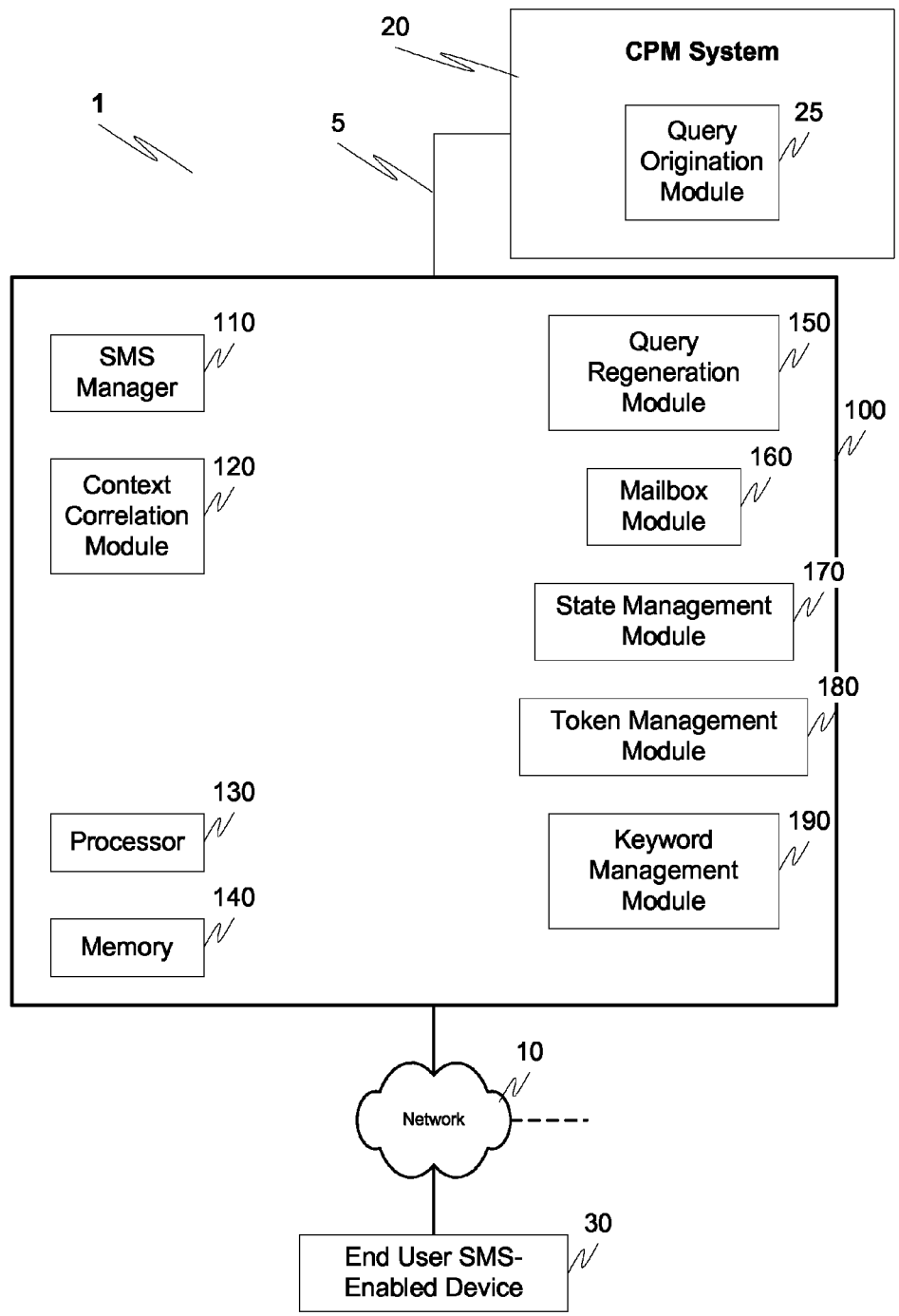
FIG. 1 illustrates an exemplary messaging system according to this invention.

FIG. 1 illustrates an exemplary messaging system 1. The messaging system comprises a context management system 100 connected via one or more networks 10 to an end user SMS-enabled device 30 and, for example, via link 5 to a CPM system 20. The CPM system 20 comprises a query origination module 25.

The context management system 100 comprises an SMS manager 110, a context correlation module 120, a processor 130, memory 140, a query regeneration module 150, a mailbox module 160, a state management module 170, a token management module 180 and a keyword management module 190.

The end user SMS-enabled device 30 can be any communications end point, such as a cell phone, telephone, PDA, or the like, or in general any communications device that is capable of responding to a query.

In operation, a query originates at the CPM system 20 via, for example, the query origination module 25. This query could be generated by the query origination module 25 and/or in cooperation with one or more users and/or automatically by another system (not shown). The query is forwarded, via network 10, to an end user at the end user device 30. The SMS manager 110 in conjunction with the state management module 170 monitors the queries sent from the CPM system 20 to the end user at end user SMS device 30 and, in accordance with some exemplary embodiments, stores the queries in the mailbox module 160.

In accordance with a first exemplary embodiment, a dialog or question and answer-based approach is utilized to correlate context. In particular, one or more queries are received from the CPM system 20 and the number of queries and responses monitored to ensure a one-to-one correlation. However, if the SMS manager 110 determines that there are two or more queries without a reply, and in conjunction with the context correlation module 120 and the query regeneration module 150, the user is notified that, for example, there are two more queries without a reply, and the query regeneration module 150 queues the one or more outstanding queries without a reply for retransmission to the end user. Each queued query is then retransmitted to the user with the context management system 100 waiting for a response from each query, which is then correlated to the query using the context correlation module 120 and forwarded back at least to, for example, the CPM system 20, until responses to all queries have been received and context correlated.

In conjunction with another exemplary embodiment, a token or similar identifier can be used to assist with correlating an answer from a user at the end user device 30 to a query. More specifically, the context management system 100 receives one or more queries from the CPM system 20. In conjunction with the SMS manager 110, a token or identifier is associated with the query and stored in the mailbox module 160. The SMS manager 110 then forwards the query that includes the associated identifier to the user. The user device associates the response with the identifier from the query with the end user device 30 returning the response and identifier to the context management system 100. The context correlation module 120, in cooperation with a token management module 180, using the token or identifier, correlates the response to the appropriate query. This response of the query can optionally be saved in the mailbox module 160 with the response being returned to the CPM system 20.

In accordance with another exemplary embodiment, a keyword is used to assist with context correlation between multiple messages and responses. In particular, the context management system 100 receives one or more queries. These queries can optionally be indexed and stored in the mailbox module 160 to facilitate future context correlation. Then, in cooperation with the SMS manager 110, the query is forwarded to the user. The user, utilizing the end user device 30 responds to the query and additionally selects a keyword from the query to be returned with the response. This response and selected keyword are then returned to the context management system 100.

The context management system 100, and in particular the SMS manager 110, receives the response and the keyword, and in conjunction with the context correlation module 120 and keyword management module 190 correlates, for example, by matching the keyword with the corresponding word in the query, the user selected keyword to the one or more outstanding queries. As an alternative, the end user device could, for example, automatically select an arbitrary word from the query, preferably using some type of intelligence to assist with the selection of words that are likely to be unique, and this word used as the keyword for context correlation.

Then, the keyword management module 190 determines if there is a conflict, e.g., the same keyword has been used for multiple queries, or if, for example, the selected keyword is unclear e.g., there is no match in the outstanding queries.

If there is a conflict or the keyword is unclear, the query can be sent to the user requesting clarification. This clarification can be the user selecting another keyword from the query or, for example, as was discussed in relation to the repeated question embodiment, the query repeated to the user. Once context has been clarified, the response to the query can be forwarded, via the SMS manager 110, back to the CPM system 20.

In accordance with an optional embodiment, the context management system 100, in cooperation with one or more of the processor 130 and memory 140, can determine if messages sent by the CPM system 20 to the end user at the end user device 30 are actually queries. For example, a determination can be made as to whether alternatives are provided in a message that requires an answer, such as the message concluding with a question mark. Other types of punctuation could also be identified as query-type messages such as "yes/no" and/or phrases such as "please select A, B or C." A determination of whether a message is a query could then be used to filter out those messages that are not queries so the context management system 100 could ignore them when performing context correlation.

Figure 2:
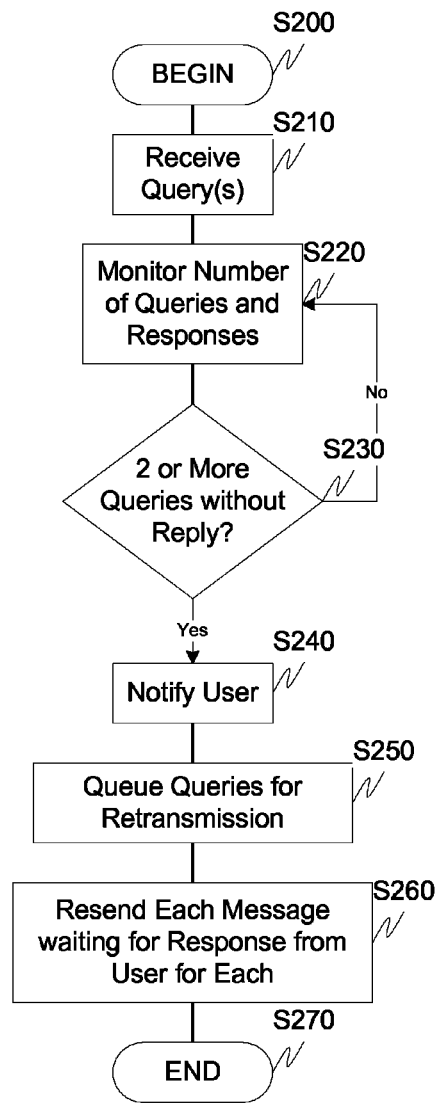
FIG. 2 illustrates an exemplary process for message context correlation according to a first embodiment of this invention.

FIG. 2 outlines an exemplary methodology for context correlation according to one embodiment of this invention. In particular, control begins in step S200 and continues to step S210. In step S210, one or more queries are received. Next, in step S220, the number of queries and responses are monitored. Then, in step S230, a determination is made whether there are two or more queries that have not received a reply. If there are not two or more queries that had not received a reply, control jumps back to step S220. Otherwise, control continues to step S240.

In step S240, a notification is provided to the user that, for example, there are two or more queries that have not received a reply. Control then continues to step S250. In step S250, the two or more queries that have not received a reply, are queued for retransmission to the user. Next, at step S260, each of the queued messages are resent to the end user with the system waiting for a response from the user for each query. These responses are then correlated to the immediately preceding query and the response forwarded to, for example, a CPM system and/or the query origination point.

Figure 3:
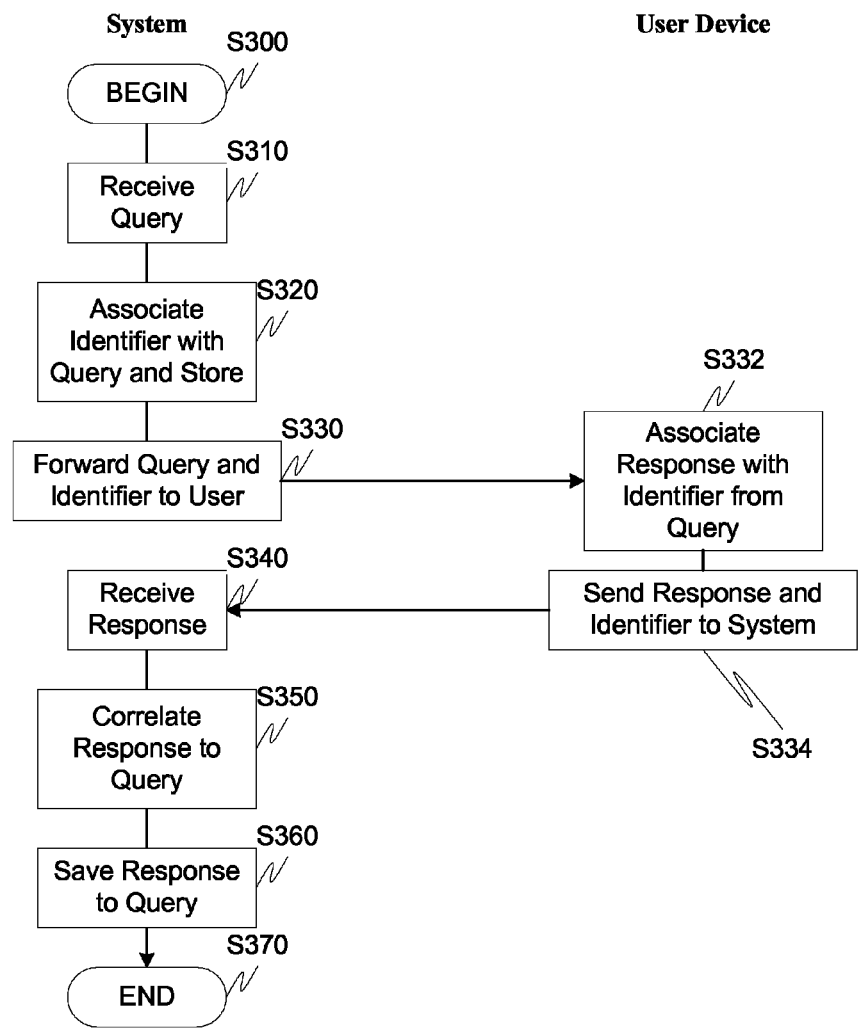
FIG. 3 illustrates a flow chart a token-based method for correlating message context according to this invention.

FIG. 3 outlines an exemplary methodology for message context correlation and the exchange between a system, such as a context management system and a user device. In accordance with this particular embodiment, a token or identifier is used to assist with the message context correlation. Specifically, control begins at step S300 and continues to step S310. In step S310, one or more queries are received. Next, in step S320, each query is associated with a unique identifier and the query and identifier stored. For example, this identifier can be included in the body of the message or, for example, embedded in a header-portion of the message. The query and identifier are then forwarded to the user in step S330. In step S332, and upon a user responding to the query, the end user device can incorporate the identifier into the response to the query. The response and associated identifier are then returned to the system at step S334 with control continuing to step S340.

In step S340, the system receives the response and the associated identifier from the user device. Utilizing the associated identifier, in step S350, the system correlates the response to the corresponding query having a matching identifier. The correlation can be based on matching the identifier in the query to the identifier in the response. For example, the identifier "Query 21" can be associated with a query. The response from the end point is also associated with the same "Query 21" identifier when it is returned to the context management system. The query identifier is then matched to the response identifier to correlate the response to the query. Then, in step S360, the response to the query can optionally be saved, such as in a mailbox, with control continuing to step S370 where the control sequence ends.

This process could optionally be continued with a determination as to whether there are more pending queries, and entering into a synchronous dialog with the user about the pending queries (with no identifier necessarily required).

As will be appreciated, the identifier can be, for example, an automatically generated alpha or alpha-numeric identifier. Furthermore, it should be appreciated that one or more of the query, response and identifier can be encrypted.

Figure 4:
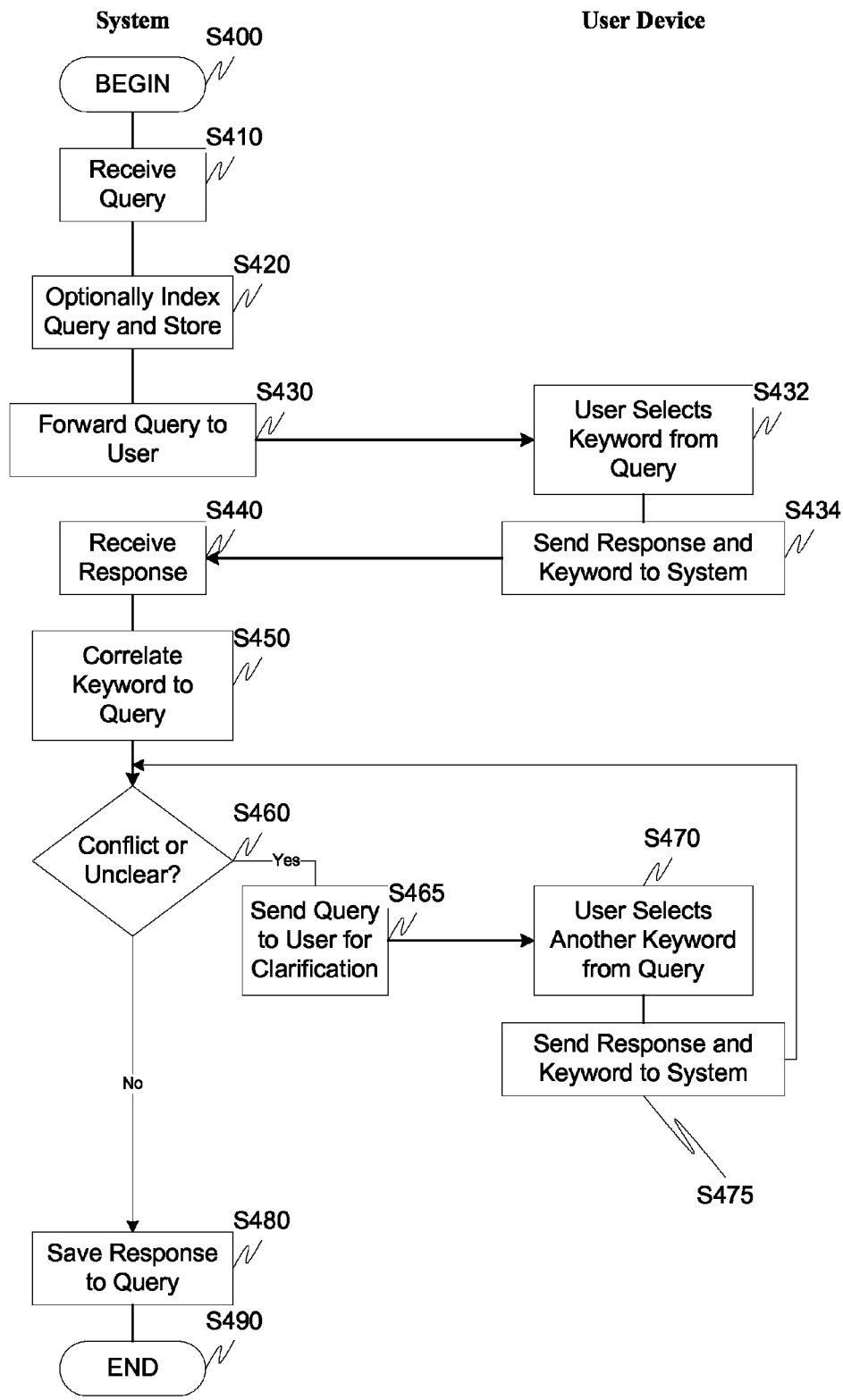
FIG. 4 is a flow chart illustrating an exemplary method for a keyword-based methodology for correlating message context according to this invention.

FIG. 4 outlines an exemplary methodology for correlating message context using a keyword, such as a user, user device and/or context management system selected keyword. In particular, control begins in step S400 and continues to step S410.

In step S410, one or more queries are received. Next, in step S420, the one or more queries can optionally be indexed and stored to assist with, for example, keyword correlation. Then, in step S430, the query is forwarded to the user. Control then continues to step S432.

In step S432, one or more of the user selects and the end user device selects a keyword. This keyword could also optionally be selected by the context management system and included in the query in a similar manner to the token-based approach discussed above. This keyword, and the response to the query, is then returned at step S434 to the system.

In step S440, the system receives the response and tries to match the selected keyword to one or more outstanding queries in step S450. Next, in step S460, a determination is made whether, for example, the user has selected the same keyword that is present in one or more queries or whether the keyword is unclear, such as there are no matches in outstanding unanswered queries for the selected keyword.

If there is a conflict or the keyword is unclear, control continues to step S465 where a query is sent to the user requesting clarification. For example, the dialog-based approach discussed earlier could be used to resolve ambiguities and/or the query could be resent to the user. Next, in step S470, the user and/or the user device is capable of selecting another keyword in responding to the query. This newly selected keyword and response are returned to the system in step S475 where control jumps back to step S460.

However, if the system is able to correlate the keyword, and thus the response, to an outstanding query, control continues to step S480 where the response is optionally saved and/or forwarded to, for example, the CPM system. Control then continues to step S490 where the control sequence ends.

Figure 5:
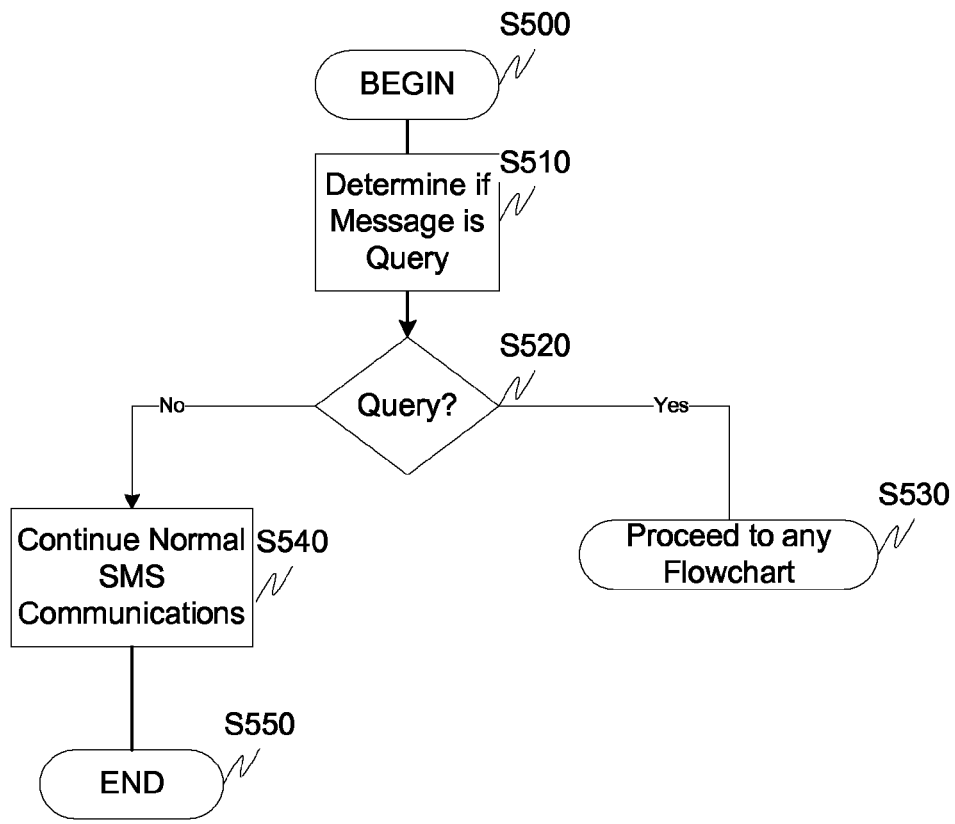
FIG. 5 is a storage-based method for correlating message context according to this invention.

FIG. 5 illustrates an exemplary methodology for filtering non-query based messages to assist with maximizing context correlation efficiency. In particular, control begins in step S500 and continues to step S510. In step S510, the system determines if the message is a query. For example, as discussed above, certain types of punctuation and/or grammar can be analyzed to assist with determining whether the message is a query. Next, in step S520, a determination is made whether the message is a query. If the message is a query, control continues to step S530 and continues to any of the previously discussed flowcharts. If it is determined the message is not a query, control jumps to step S540 where, for example, normal SMS communications can continue with control continuing to step S550 where the control sequence ends.

A number of variations and modifications of the invention can be used. It would be possible to provide for some features of the invention without providing others.

The exemplary systems and methods of this invention have been described in relation to correlating context between queries and responses. However, to avoid unnecessarily obscuring the present invention, the description omits a number of known structures and devices. This omission is not to be construed as a limitation of the scope of the claimed invention. Specific details are set forth to provide an understanding of the present invention. It should however be appreciated that the present invention may be practiced in a variety of ways beyond the specific detail set forth herein.

Furthermore, while the exemplary embodiments illustrated herein show various components of the system collocated, certain components of the system can be located remotely, at distant portions of a distributed network, such as a LAN, cable network, and/or the Internet, or within a dedicated system. Thus, it should be appreciated, that the components of the system can be combined in to one or more devices, such as a messaging system, or collocated on a particular node of a distributed network, such as an analog and/or digital communications network, a packet-switch network, a circuit-switched network or a cable network.

It will be appreciated from the preceding description, and for reasons of computational efficiency, that the components of the system can be arranged at any location within a distributed network of components without affecting the operation of the system. For example, the various components can be located in a switch such as a PBX and media server, gateway, a cable provider, enterprise system, in one or more communications devices, at one or more users' premises, or some combination thereof. Similarly, one or more functional portions of the system could be distributed between a communications device(s), such as a PDA, and an associated computing device.

Furthermore, it should be appreciated that the various links, such as link 5, connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the invention.

In yet another embodiment, the systems and methods of this invention can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this invention.

Exemplary hardware that can be used for the present invention includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this invention is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this invention can be implemented as a program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present invention describes components and functions implemented in the embodiments with reference to particular standards and protocols, the invention is not limited to such standards and protocols. Other similar standards and protocols not mentioned herein are in existence and are considered to be included in the present invention. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present invention.

The present invention, in various embodiments, configurations, and aspects, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease and/or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments, configurations, or aspects for the purpose of streamlining the disclosure. The features of the embodiments, configurations, or aspects of the invention may be combined in alternate embodiments, configurations, or aspects other than those discussed above. This method of disclosure is not to be interpreted as reflecting an intention that the claimed invention requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the invention.

Moreover, though the description of the invention has included description of one or more embodiments, configurations, or aspects and certain variations and modifications, other variations, combinations, and modifications are within the scope of the invention, e.g., as may be within the skill and knowledge of those in the art, after understanding the present disclosure. It is intended to obtain rights which include alternative embodiments, configurations, or aspects to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

The invention claimed is:

1. A message correlation system comprising:
a message manager and processor that determine whether there are two or more outstanding queries to which a response from a user to any of the outstanding queries that includes no context would render the response uncorrelatable to one of the outstanding queries; and
a keyword management module that correlates a keyword associated with a response to an outstanding query, wherein, when there is a conflict where the keyword is used in at least two of the two or more outstanding queries or the keyword is not used in the two or more outstanding queries, a supplemental query is sent to the user requesting clarification.

2. The system of claim 1, further comprising
a query regeneration module that resends each outstanding query and waits for a response thereto in response to determining whether there are two or more outstanding queries.

3. The system of claim 2, wherein the one or more messages are Short Message System-type messages.

4. The system of claim 1, further comprising a context correlation module that maps an identifier in the response to an identifier in the outstanding query.

5. The system of claim 1, further comprising a context correlation module that matches the keyword in the response to a same keyword in the outstanding query.

6. The system of claim 1, wherein one or more of an end user, an end user device and the keyword management module select the keyword.

7. The system of claim 1, wherein the message manager further filters non-query based messages from context correlation mapping.

8. A message correlation method comprising:
determining, by a processor, whether there are two or more outstanding queries to which a response from a user to any of the outstanding queries that includes no context would render the response uncorrelatable to one of the outstanding queries; and Correlating, by the processor, a keyword associated with a response to an outstanding query, wherein, when there is a conflict where the keyword is used in at least two of the two or more outstanding queries or the keyword is not used in the two or more outstanding queries, a supplemental query is sent to the user requesting clarification.

9. The method of claim 8, further comprising in response to determining whether there are two or more outstanding queries, resending each outstanding query and waiting for a response thereto.

10. The method of claim 9, wherein the one or more messages are Short Message System-type messages.

11. The method of claim 8, further comprising mapping an identifier in the response to an identifier in an outstanding query.

12. The method of claim 8, further comprising matching the keyword in the response to a same keyword in an outstanding query.

13. The method of claim 8, wherein one or more of an end user, an end user device and a keyword management module select the keyword.

14. The method of claim 8, wherein non-query based messages are filtered from context correlation mapping.

15. The method of claim 8, further comprising resending an unanswered outstanding query when a keyword match cannot be found.

16. The method of claim 8, further comprising monitoring a state of one or more queries.

17. A non-transitory computer-readable media having stored thereon instructions that when executed perform the steps of claim 8.

18. A message correlation system comprising:

means for determining whether there are two or more outstanding queries to which a response from a user to any of the outstanding queries that includes no context would render the response uncorrelatable to one of the outstanding queries; and means for correlating a keyword associated with a response to an outstanding query, wherein, when there is a conflict where the keyword is used in at least two of the two or more outstanding queries or the keyword is not used in the two or more outstanding queries, a supplemental query is sent to the user requesting clarification.

19. The system of claim 1, wherein the conflict is where the keyword is used in at least two of the two or more outstanding queries.

20. The system of claim 1, wherein the conflict is where the keyword is not used in the two or more outstanding queries.

* * * * *